US008774026B2

(12) United States Patent
Saito

(10) Patent No.: US 8,774,026 B2
(45) Date of Patent: Jul. 8, 2014

(54) WIRELESS COMMUNICATION DEVICE

(75) Inventor: Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 305 days.

(21) Appl. No.: 13/038,708

(22) Filed: Mar. 2, 2011

(65) Prior Publication Data
US 2011/0242983 A1 Oct. 6, 2011

(30) Foreign Application Priority Data

Mar. 30, 2010 (JP) ................................. 2010-077454

(51) Int. Cl.
*H04L 12/26* (2006.01)
(52) U.S. Cl.
USPC .......................................... 370/252; 370/241
(58) Field of Classification Search
None
See application file for complete search history.

(56) References Cited

U.S. PATENT DOCUMENTS

| | | | |
|---|---|---|---|
| 7,668,508 B2 | 2/2010 | Zheng et al. | |
| 7,966,489 B2 * | 6/2011 | Cam-Winget et al. | 713/163 |
| 8,050,243 B2 * | 11/2011 | Ostergren | 370/338 |
| 2003/0061363 A1 | 3/2003 | Bahl et al. | |
| 2003/0147392 A1 | 8/2003 | Hayashi et al. | |
| 2003/0204748 A1 | 10/2003 | Chiu | |
| 2005/0038991 A1 | 2/2005 | Brown et al. | |
| 2005/0125693 A1 | 6/2005 | Duplessis et al. | |
| 2005/0144237 A1 * | 6/2005 | Heredia et al. | 709/206 |
| 2006/0013175 A1 * | 1/2006 | Lee | 370/338 |
| 2006/0098614 A1 | 5/2006 | Moon et al. | |
| 2006/0105713 A1 | 5/2006 | Zheng et al. | |
| 2008/0043686 A1 * | 2/2008 | Sperti et al. | 370/338 |
| 2008/0181187 A1 * | 7/2008 | Scott et al. | 370/338 |
| 2009/0271709 A1 * | 10/2009 | Jin et al. | 715/739 |
| 2009/0274065 A1 * | 11/2009 | Jin et al. | 370/254 |
| 2010/0100642 A1 | 4/2010 | Zheng et al. | |
| 2010/0329461 A1 | 12/2010 | Duplessis et al. | |
| 2011/0085447 A1 * | 4/2011 | Kholaif et al. | 370/242 |

FOREIGN PATENT DOCUMENTS

| | | |
|---|---|---|
| JP | 2005-176320 | 6/2005 |
| JP | 2007081890 A | 3/2007 |
| JP | 2008-520164 | 6/2008 |
| JP | 2008227660 A | 9/2008 |
| JP | 2009-017332 | 1/2009 |

OTHER PUBLICATIONS

European Search Report dated Sep. 14, 2011, corresponding Application 11155699.9; English Translation.

(Continued)

*Primary Examiner* — Donald Mills
(74) *Attorney, Agent, or Firm* — Banner & Witcoff, Ltd.

(57) ABSTRACT

A wireless communication device may perform a first determination process of determining whether the access point operates in accordance with a first type of authentication protocol in which an authentication is performed by an authentication server or operates in accordance with a second type of authentication protocol in which an authentication is performed by the access point, and make a diagnosis of a wireless connection state of the wireless communication device based on a determination result of the first determination process so as to create a diagnosis result. In a case where the wireless connection state is a connection error state, the diagnosis result may include at least one of a reason by which the connection error state has occurred and a countermeasure for resolving the connection error state. The wireless communication device may output the diagnosis result outside.

12 Claims, 9 Drawing Sheets

(56) References Cited

OTHER PUBLICATIONS

JP Office Action mailed Jul. 3, 2012, JP Appln. 2010-077454, English translation.

CN Office Action mailed Jun. 5, 2013, CN Appln. 201110083705.0, English translation.

Office Action issued in corresponding Chinese Patent Application No. 201110083705.0 mailed Feb. 24, 2014.

* cited by examiner

FIG. 2

| Authentication Method Type | Authentication Method | | Encryption Method | Inner Authentication Method | |
|---|---|---|---|---|---|
| | Authentication Protocol | EAP Authentication Method | | | |
| Enterprise Type | WPA-Enterprise | EAP-FAST | TKIP | NONE | *1 |
| | | | | MSCHAPv2 | |
| | | | | GTC | |
| | | | | TLS | |
| | | PEAP | TKIP | MSCHAPv2 | |
| | | | | GTC | |
| | | | | TLS | |
| | | EAP-TTLS | TKIP | CHAP | |
| | | | | MSCHAP | |
| | | | | MSCHAPv2 | |
| | | | | PAP | |
| | | EAP-TLS | TKIP | — | *2 |
| | WPA2-Enterprise | EAP-FAST | AES | NONE | *1 |
| | | | | MSCHAPv2 | |
| | | | | GTC | |
| | | | | TLS | |
| | | PEAP | AES | MSCHAPv2 | |
| | | | | GTC | |
| | | | | TLS | |
| | | EAP-TTLS | AES | CHAP | |
| | | | | MSCHAP | |
| | | | | MSCHAPv2 | |
| | | | | PAP | |
| | | EAP-TLS | AES | — | *2 |
| Personal Type | WPA-PSK | — | TKIP | — | *3 |
| | | | AES | — | |
| | WPA2-PSK | — | TKIP | — | |
| | | | AES | — | |
| | Open | — | WEP | — | *4 |
| | | | — | — | |
| | Shared key | — | WEP | — | |

*1 : User ID and Password
*2 : User ID and Client Certification
*3 : Password(8~64 Characters)
*4 : Password(5,10,13,26 Characters)

WIRELESS COMMUNICATION DEVICE

CROSS-REFERENCE TO RELATED APPLICATIONS

This application claims priority to Japanese Patent Application No. 2010-077454, filed on Mar. 30, 2010, the contents of which are hereby incorporated by reference into the present application.

TECHNICAL FIELD

The present specification discloses a wireless communication device that is wirelessly connected with an access point.

DESCRIPTION OF RELATED ART

For example, an assistance technique of troubleshooting by diagnosing a wireless connection state of a wireless network may be known. Moreover, for example, various types of wireless networks; e.g., a non-encrypted network, a WEP (Wired Equivalent Privacy) encrypted network, a WPA (WiFi Protected Access) encrypted network, an IEEE (The Institute of Electrical and Electronics Engineers, Inc.) 802.1X compliant network and the like may be known.

SUMMARY

Although the first document discloses diagnosing a wireless connection state of a wireless network, it does not disclose specific diagnosis methods. Accordingly, with the technology of the first document, it is difficult to appropriately diagnose a wireless communication state under circumstances where the foregoing various types of wireless networks can be configured and, consequently, it is difficult to provide an appropriate diagnosis result of a wireless connection state to a user. The present specification provides a technology that may provide an appropriate diagnosis result of a wireless connection state to a user.

One technique disclosed in the present application is a wireless communication device configured to be wirelessly connected with an access point. The wireless communication device may comprise an obtaining unit, a determination unit, a diagnosis unit, and an outputting unit. The obtaining unit may be configured to obtain specific information from the access point. The determination unit may be configured to perform, by utilizing the specific information, a first determination process of determining whether the access point operates in accordance with a first type of authentication protocol in which an authentication is performed by an authentication server or operates in accordance with a second type of authentication protocol in which an authentication is performed by the access point. The diagnosis unit may be configured to make a diagnosis of a wireless connection state of the wireless communication device based on a determination result of the first determination process so as to create a diagnosis result. In a case where the wireless connection state is a connection error state, the diagnosis result may include at least one of a reason by which the connection error state has occurred and a countermeasure for resolving the connection error state. The outputting unit may be configured to output the diagnosis result outside.

Note that a method, computer program, and non-transitory computer-readable recording medium storing the computer program for realizing the foregoing wireless communication device are also novel and useful.

BRIEF DESCRIPTION OF THE DRAWINGS

FIG. 2 shows a table for explaining authentication methods.

EMBODIMENT

Figure 1:
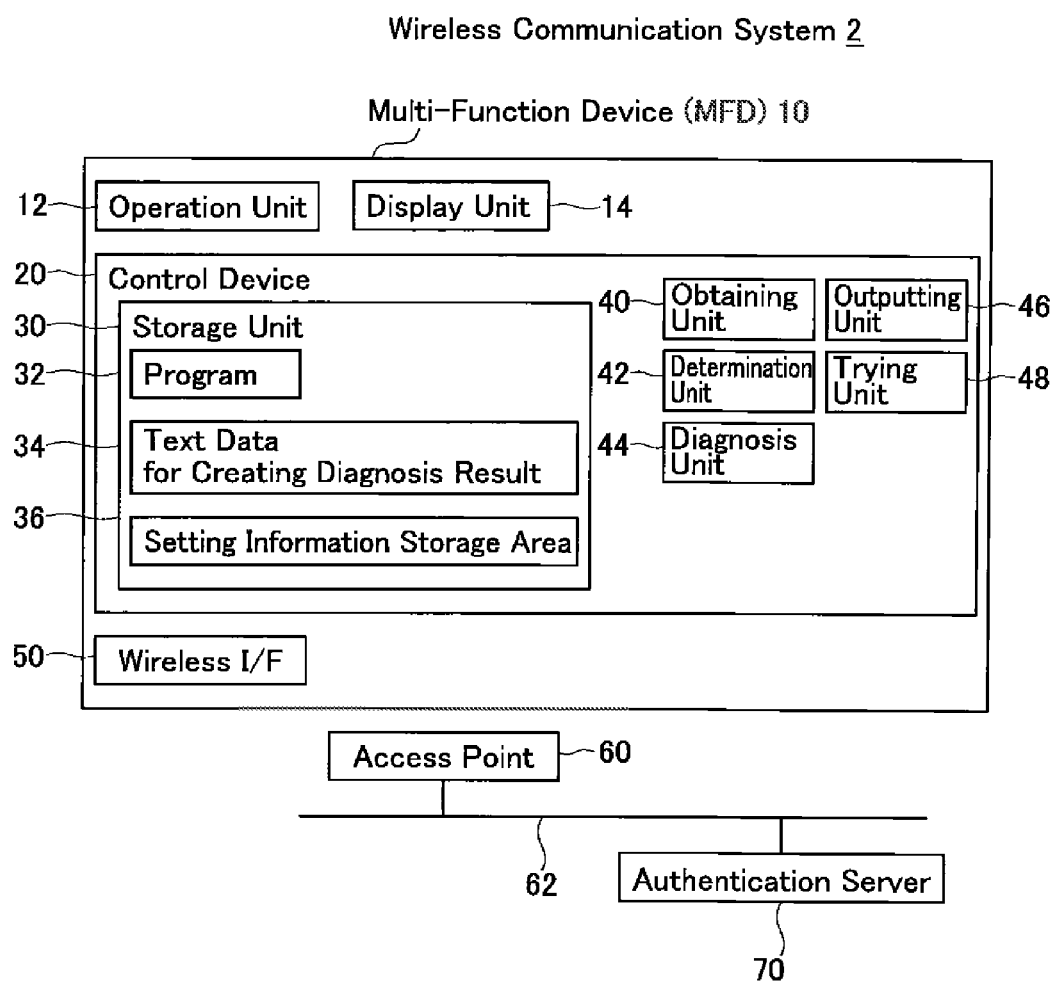
FIG. 1 shows an example of a configuration of a wireless communication system.

An embodiment is now explained with reference to the drawings. As shown in FIG. 1, a wireless communication system 2 comprises a multi-function device 10, an access point 60 (an "access point" is hereinafter referred to as an "AP"), and an authentication server 70. The AP 60 is able to communicate with the authentication server 70 via a wired LAN 62. The multi-function device 10 can make an wireless connection with the AP 60. Note that, in this embodiment, the term "wireless connection" is used in the following context. Specifically, in a state where the multi-function device 10 is in the "wireless connection" with the AP 60, the multi-function device 10 is able to communicate with another device (e.g., a PC not shown) via the AP 60. Meanwhile, if the multi-function device 10 is not in the "wireless connection" with the AP 60, the multi-function device 10 may perform wireless communication with the AP 60 (e.g., the wireless communication of S50 and S52 of FIG. 5 described later), but is unable to communicate with another device via the AP 60.

(Configuration of Multi-Function Device 10)

The multi-function device 10 is a peripheral device of a PC not shown. The multi-function device 10 comprises an operation unit 12, a displaying unit 14, a control device 20, and a wireless interface 50. Note that the multi-function device 10 further comprises a scanning unit and a printing unit not shown. The operation unit 12 is configured from a plurality of buttons to be operated by a user. The displaying unit 14 is a display for displaying various types of information. The wireless interface 50 is an interface for the multi-function device 10 to perform wireless communication.

The control device 20 comprises a storage unit 30. The storage unit 30 stores a program 32 to be executed by the control device 20. As a result of the control device 20 performing processes according to the program 32, the respective functions of an obtaining unit 40, a determination unit 42, a diagnosis unit 44, an outputting unit 46, and a trying unit 48 are realized. The storage unit 30 further stores text data 34 for creating a diagnosis result in the processes of FIG. 9 and FIG. 10 described later. Moreover, the storage unit 30 comprises a setting information storage area 36. The setting information storage area 36 stores wireless setting information for achieving a wireless connection with the AP 60. The user (e.g., administrator of the wireless communication system 2) can operate the operating unit 12 of the multi-function device 10 or an operation unit of a PC not shown to input the wireless setting information for the multi-function device (e.g., an authentication method, encryption method, inner authentication method, user ID, password or the like of FIG. 2 described later) in the multi-function device 10. The wireless setting information that is input by the user is stored (set) in the setting information storage area 36.

(Function of AP 60)

The AP 60 relays the wireless communication between the multi-function device 10 and another device. The administrator of the wireless communication system 2 sets in advance, in the AP 60, the wireless setting information for operating the AP 60 according to either an enterprise type authentication protocol or a personal type authentication protocol (refer to FIG. 2). For example, the administrator sets enterprise type wireless setting information in the AP 60 in advance in order to operate the AP 60 according to the enterprise type authentication protocol. The enterprise type wireless setting information includes, e.g., information (for instance, IP address of the authentication server 70) for the AP 60 to communicate with the authentication server 70. Moreover, the administrator sets personal type wireless setting information in the AP 60 in advance in order to operate the AP 60 according to the personal type authentication protocol. The personal type wireless setting information included, e.g., information showing one combination of a personal type authentication method (authentication protocol) and encryption method described later.

If the enterprise type wireless setting information is set in the AP 60, the AP 60 causes the authentication server 70 to perform an authentication for the multi-function device 10 when the multi-function device 10 tries to achieve a wireless connection with the AP 60. Specifically, the AP 60 obtains authentication information required for the authentication from the multi-function device 10, and sends the authentication information to the authentication server 70. The authentication server 70 uses the received authentication information to perform the authentication for the multi-function device 10, and sends the authentication result to the AP 60. The AP 60 allows the multi-function device 10 to achieve the wireless connection with the AP 60 if the authentication result is successful, and prohibits the multi-function device 10 from achieving the wireless connection with the AP 60 if the authentication result is a failure.

Moreover, if the personal type wireless setting information is set in the AP 60, the AP 60 performs an authentication for the multi-function device 10 on its own when the multi-function device 10 tries to achieve a wireless connection with the AP 60. Specifically, the AP 60 acquires authentication information from the multi-function device 10, and uses the authentication information to perform the authentication for the multi-function device 10. The AP 60 allows the multi-function device 10 to achieve the wireless connection with the AP 60 if the authentication result is successful, and prohibits the multi-function device 10 from achieving the wireless connection with the AP 60 if the authentication result is a failure.

(Enterprise Type Authentication Method)

FIG. 2 shows an example of the authentication methods that are available to the multi-function device 10. The authentication methods are classified into an enterprise type authentication method and a personal type authentication method. The enterprise type authentication method is classified into two types of enterprise type authentication protocols of WPA (WiFi-Protected Access)-Enterprise and WPA2-Enterprise. WPA-Enterprise conforms to IEEE (The Institute of Electrical and Electronics Engineers, Inc.) 802.1x, is a standard that was further expanded from IEEE802.1x, and is a standard that was formulated based on Wi-Fi Alliance. WPA2-Enterprise is a standard that was further expanded from WPA-Enterprise, and is a standard that was formulated based on the Wi-Fi Alliance. Specifically, the enterprise type authentication method is an authentication method for achieving the wireless communication using IEEE802.1x.

WPA-Enterprise and WPA2-Enterprise are both further classified into a plurality of EAP (Extensible Authentication Protocol) authentication methods. The plurality of EAP authentication methods includes EAP-FAST (EAP-Flexible Authentication via Secured Tunnel), PEAP (Protected EAP), EAP-TTLS (EAP-Tunneled Transport Layer Security), and EAP-TLS (EAP-Transport Layer Security).

The respective EAP authentication methods of WPA-Enterprise use an encryption method of TKIP (Temporal Key Integrity Protocol). Moreover, the respective EAP authentication methods of the WPA2-Enterprise use an encryption method of AES (Advanced Encryption Standard). Note that, as is clear from the foregoing explanation, in this embodiment, as to WPA-Enterprise, there are four combinations of the EAP authentication method and the encryption method, and as to WPA2-Enterprise, there are four combinations of the EAP authentication method and the encryption method. Specifically, in this embodiment, as to the enterprise type authentication method, there are a total of eight combinations.

Moreover, in either of WPA-Enterprise or WPA2-Enterprise, if EAP-FAST, PEAP, or EAP-TTLS is used, an inner authentication is performed according to an inner authentication method selected by the user of the device (e.g., the multi-function device 10) to be authenticated. Moreover, if EAP-TLS is used, the inner authentication method is not selected by the user of the device to be authenticated, and an authentication is performed with a uniform method. The inner authentication method is classified into NONE, CHAP (Challenge Handshake Authentication Protocol), MSCHAP (Microsoft CHAP), MSCHAPv2, GTC (Generic Token Card), TLS (Transport Layer Security), and PAP (Password Authentication Protocol). Note that the foregoing "NONE" is one type of inner authentication method, and does not mean that the inner authentication is not performed. The available inner authentication method differs according to the EAP authentication method. For example, with EAP-FAST, one inner authentication method among NONE, MSCHAPv2, GTC, and TLS is available, and with PEAP, one inner authentication method among MSCHAPv2, GTC, and TLS is available.

Note that if EAP-FAST, PEAP, or EAP-TTLS is used, the authentication server 70 uses the user ID and password to authenticate the multi-function device 10 (refer to *1 of FIG. 2). Accordingly, if the AP 60 and the multi-function device 10 are wirelessly connected using EAP-FAST, PEAP, or EAP-TTLS, it is necessary to pre-set (register) the same user ID and password in both the authentication server 70 and the multi-function device 10. Meanwhile, if EAP-TLS is used, the authentication server 70 uses the user ID and client certification to authenticate the multi-function device 10 (refer to *2 of FIG. 2). Accordingly, if the AP 60 and the multi-function device 10 are wirelessly connected using EAP-TLS, it is necessary to pre-set (register) the same user ID and client certification in both the authentication server 70 and the multi-function device 10.

(Personal Type Authentication Method)

The personal type authentication method is an authentication method for achieving wireless communication which does not use IEEE802.1x. The personal type authentication method is classified into four types of personal type authentication protocols of WPA-PSK (WPA-Pre-shared Key), WPA2-PSK, Open, and Shared key. Note that "Open" is a protocol for which authentication is not performed, but is treated as one type of authentication protocol in this specification.

WPA-PSK and WPA2-PSK use an encryption method of TKIP or AES. Open uses an encryption method of WEP (Wired Equivalent Privacy), or does not use any encryption method (None). Shared key uses an encryption method of WEP. Note that, as is clear from the foregoing explanation, in this embodiment, as to the personal type authentication protocol, there are six combinations of the authentication method and the encryption method. The foregoing six combinations do not include Open in which an encryption method is not used, and includes Open in which the encryption method of WEP is used.

Note that if WPA-PSK or WPA2-PSK is used, the AP 60 uses a password of 8 to 64 characters to authenticate the multi-function device 10 (refer to *3 of FIG. 2). Accordingly, if the AP 60 and the multi-function device 10 are to be wirelessly connected using WPA-PSK or WPA2-PSK, the administrator needs to pre-register the same password of 8 to 64 characters in both the AP 60 and the multi-function device 10. Moreover, if Open (referring only to the "Open" in which the encryption method of WEP is used) or Shared key is used, the AP 60 uses a password (WEP key) of 5, 10, 13, or 26 characters to authenticate the multi-function device 10 (refer to *4 of FIG. 2). Accordingly, if the AP 60 and the multi-function device 10 are to be wirelessly connected using Open or Shared key, the administrator needs to pre-register the same password coinciding with the foregoing number of characters in both the AP 60 and the multi-function device 10.

(Main Process)

The main process performed by the control device 20 of the multi-function device 10 is now explained with reference to FIG. 3. The control device 20 monitors the wireless connection state of the multi-function device 10 to become a connection error state. For example, if the wireless setting information set in the setting information storage area 36 (refer to FIG. 1) of the multi-function device 10 is changed, or if the wireless setting information set in the AP 60 is changed, the wireless connection of the multi-function device 10 and the AP 60 may be disconnected. If the wireless connection of the multi-function device 10 and the AP 60 id disconnected, the control device 20 determines YES at S10, and then proceeds to S12.

At S12, the control device 20 performs a wireless connection trying process (refer to FIG. 5 to FIG. 8) by using the wireless setting information being set in the multi-function device 10 (wireless setting information currently stored in the setting information storage area 36). If the wireless connection trying process of S12 is successful and the wireless connection between the multi-function device 10 and the AP 60 is established, the control device 20 determines YES at S14. In this case, the control device 20 stores "0" as a notice flag in the storage unit 30 (S16), and returns to S10 and monitors the wireless connection state.

Meanwhile, if the wireless connection trying process of S12 is a failure and the wireless connection is not established between the multi-function device 10 and the AP 60, the control device 20 determines NO at S14. In this case, the control device 20 determines whether the value presently obtained in the wireless connection trying process of S12 is identical to the value previously obtained in the wireless connection trying process of S12 which had been previously performed. The value obtained in the wireless connection trying process is described in detail later. If it is YES in the foregoing case, the control device 20 stores "0" as the notice flag in the storage unit 30 (S20), and returns to S10 and monitors the wireless connection state. If it is NO at S18, the control device 20 stores "1" as the notice flag in the storage unit 30 (S22), and returns to S10 and monitors the wireless connection state. Specifically, the notice flag is set as "1" when the two values obtained in the previous and present wireless connection trying processes are different, and, if "1" is set as the notice flag, the diagnosis result described later is output.

If S20 and S22 are performed, since the wireless connection trying process of S12 was unsuccessful, the wireless connection state is still in the connection error state. Accordingly, the control device 20 determines YES at S10 once again, and performs the processes of S12 onward once again. Until the connection error state is resolved (i.e., until the wireless connection state becomes a normal state), the determination is YES at S10, and the processes of S12 are repeatedly performed.

(Output Control Process)

The output control process performed by the control device 20 is now explained with reference to FIG. 4. The control device 20 monitors the input of an instruction by the user for making a diagnosis of the wireless connection state (S30). The user can use the operation unit 12 of the multi-function device 10 or an operation unit of the PC not shown, and input the foregoing instruction to the multi-function device 10. In such cases, the control device 20 determines YES at S30, and proceeds to S34. Moreover, the control device 20 monitors the storage of "1" as the notice flag in the storage unit 30 (S32). Specifically, if the process of S22 of FIG. 3 is performed, the control device 20 determines YES at S32, and proceeds to S34.

Figure 9:
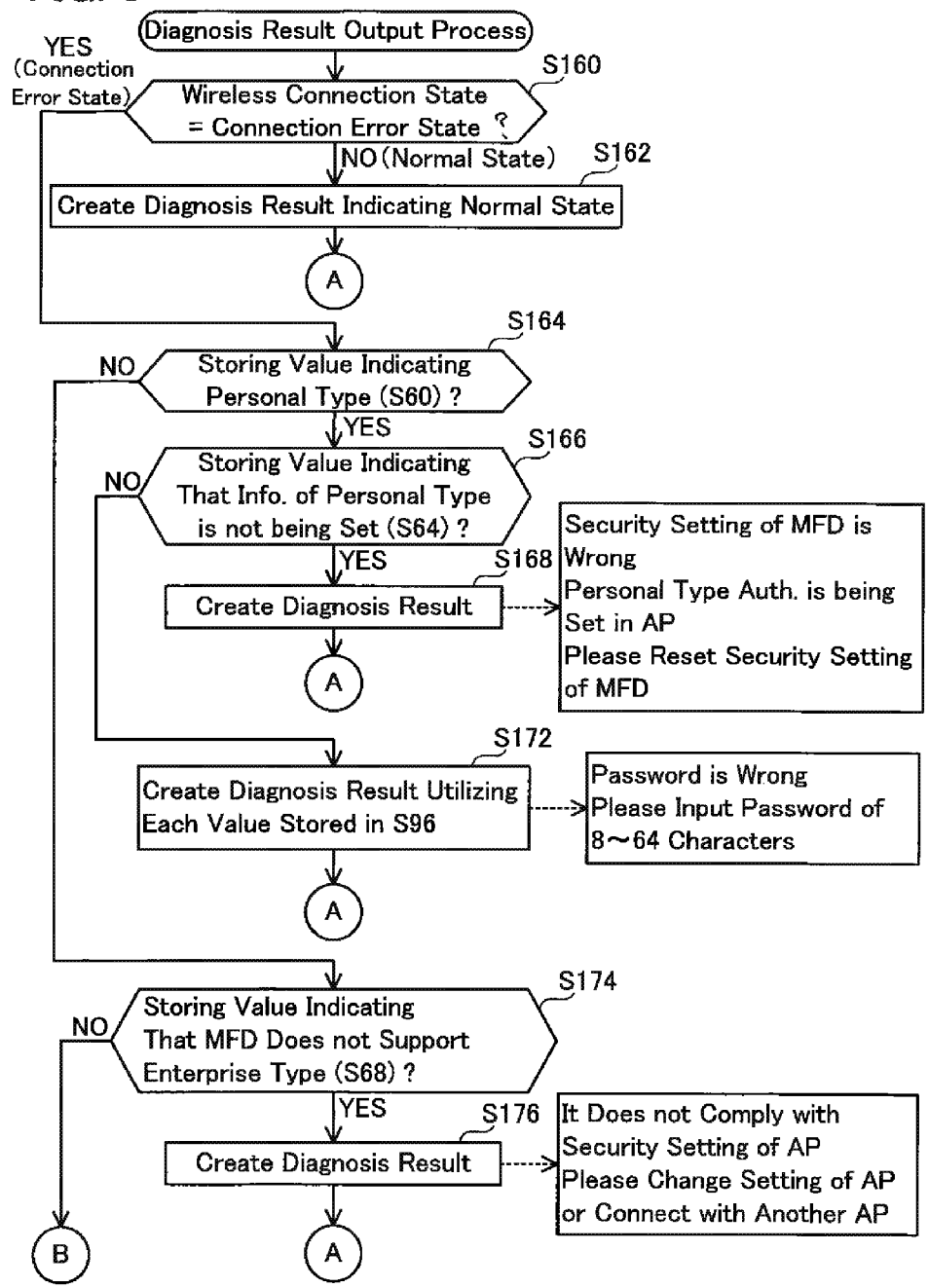
FIG. 9 shows a flowchart of a diagnosis result output process performed at S34 of FIG. 4.
Figure 10:
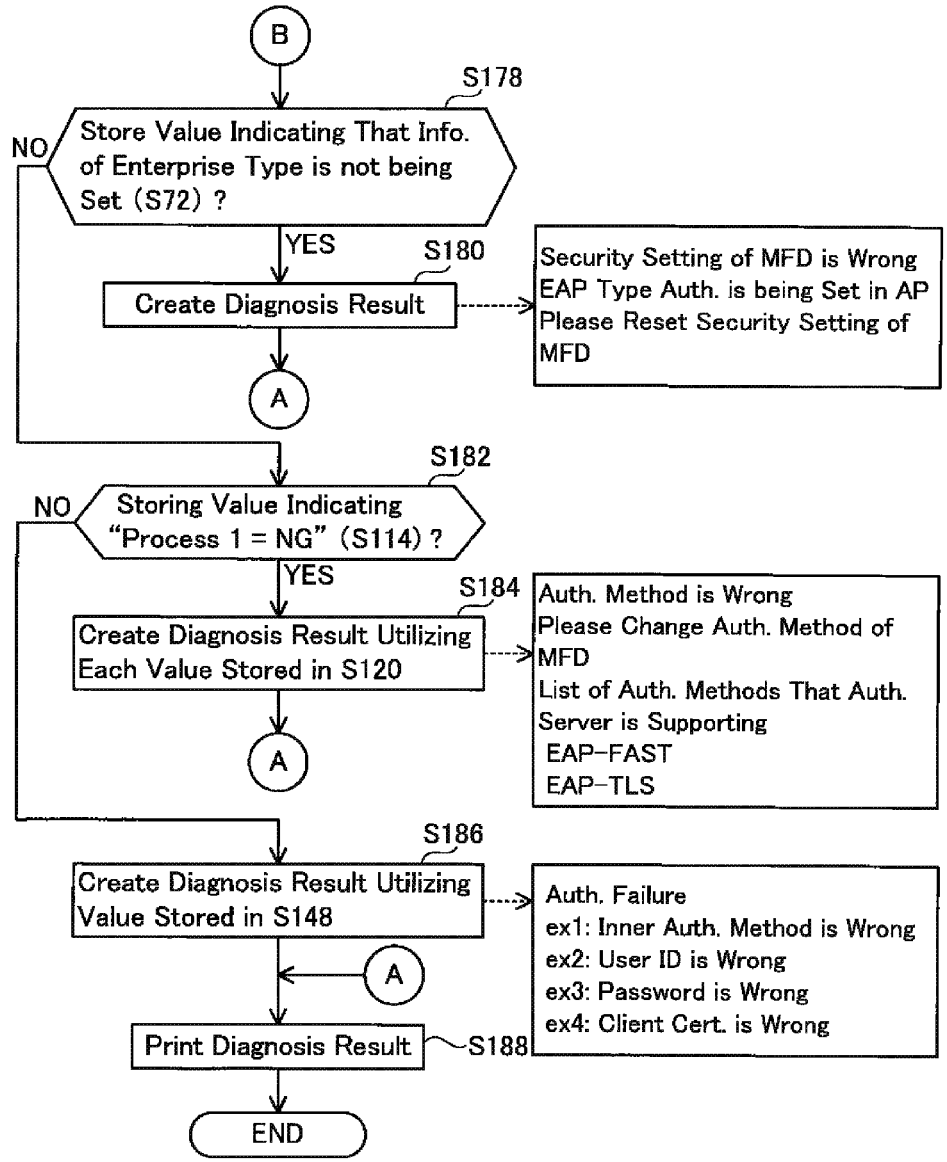
FIG. 10 shows a flowchart continued from FIG. 9.

At S34, the control device 20 performs the diagnosis result output process (refer to FIG. 9 and FIG. 10). As explained above, if it is YES at S30, or if it is YES at S32, the diagnosis result output process of S34 is performed. Specifically, if the instruction from the user is input (YES at S30), regardless of the value ("0" or "1") of the notice flag stored in the storage unit 30, the diagnosis result output process of S34 is performed. Moreover, if the instruction from the user is not input (NO at S30), the diagnosis result output process of S34 is performed if "1" is stored as the notice flag in the storage unit 30. Upon completing S34, the control device 20 stores "0" as the notice flag in the storage unit 30 (S36), and returns to S30.

(Wireless Connection Trying Process)

Figure 3:
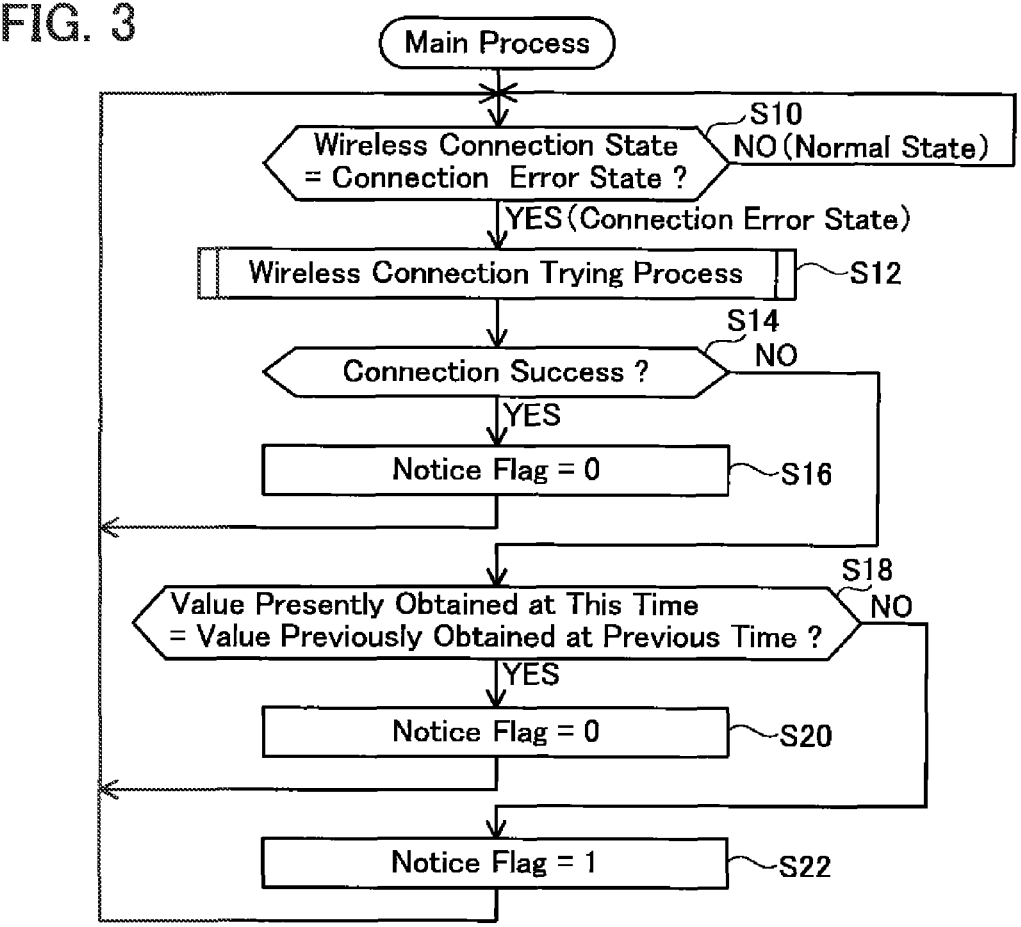
FIG. 3 shows a flowchart of a main process.

The wireless connection trying process performed at S12 of FIG. 3 is now explained with reference to FIG. 5. The obtaining unit 40 (refer to FIG. 1) of the multi-function device 10 sends a Probe Request signal by using the respective channels (i.e., respective frequency bands) for the wireless communication (S50). The AP 60 thereby receives the Probe Request signal and sends a Probe Response signal to the multi-function device 10. The obtaining unit 40 thereby receives the Probe Response signal from the AP 60 (S52). The Probe Response signal received at S52 includes an Information Element. The obtaining unit 40 obtains the Information Element by analyzing the Probe Response signal (S54).

Note that, if the wireless setting information being set in the AP 60 is enterprise type wireless setting information, the Information Element includes information showing that it is WPA-Enterprise or WPA2-Enterprise (hereinafter referred to as the "enterprise information"). Meanwhile, if the wireless setting information being set in the AP 60 is personal type wireless setting information, the Information Element does not include the enterprise information. The determination unit 42 (refer to FIG. 1) determines, by using the Information Element, whether the AP 60 operates in accordance with the enterprise type authentication protocol or operates in accordance with the personal type authentication protocol (S56). Specifically, the determination unit 42 determines that the AP 60 operates in accordance with the enterprise type authentication protocol if the enterprise information is included in the Information Element, and determines that the AP 60 operates in accordance with the personal type authentication protocol if the enterprise information is not included in the Information Element.

If it is determined that the AP 60 operates in accordance with the enterprise type authentication protocol (YES at S56), the control device 20 stores a value (e.g. "0") showing the enterprise type in the storage unit 30 (S58). Meanwhile, if it is determined that the AP 60 operates in accordance with the personal type authentication protocol (NO at S56), the control device 20 stores a value (e.g. "1") showing the personal type in the storage unit 30 (S60).

Upon completing S58 or S60, the control device 20 determines whether a value showing the enterprise type was stored in the storage unit 30 (S62). If it is NO in the foregoing case; i.e., if the AP 60 operates in accordance with the personal type authentication protocol, the determination unit 42 determines whether the personal type wireless setting information is set as the current wireless setting information of the multi-function device 10 (S63). Specifically, the determination unit 42 determines whether information showing any one of the four types of personal type authentication protocols (WPA-PSK, WPA2-PSK, Open, and Shared key) is stored in the setting information storage area 36. The determination unit 42 determines YES at S63 if the information showing the personal type authentication protocol is being stored in the setting information storage area 36, and determines NO at S63 if such information is not being stored in the setting information storage area 36 (i.e., if information showing any one of the four types of enterprise type EAP authentication methods (EAP-FAST, PEAP, EAP-TTLS, and EAP-TLS) is being stored).

If it is YES at S63; i.e., if the personal type wireless setting information is being set in the multi-function device 10, the trying unit 48 (refer to FIG. 1) performs the personal type trying process (refer to FIG. 6) (S65). When the personal type trying process is complete, the wireless connection trying process is ended.

Moreover, if it is NO at S63; i.e., if the personal type wireless setting information is not being set in the multi-function device 10 (if the enterprise type wireless setting information is being set), the determination unit 42 stores, in the storage unit 30, a value showing that the personal type wireless setting information is not being set (S64). When S64 is complete, the wireless connection trying process is ended.

Meanwhile, if it is YES at S62; i.e., if the AP 60 operates in accordance with the enterprise type authentication protocol, the determination unit 42 additionally determines whether the multi-function device 10 is supporting the enterprise type authentication protocol (S66). In this embodiment, the multi-function device 10 is supporting WAP-Enterprise and WAP 2-Enterprise shown in FIG. 2. Accordingly, the determination unit 42 determines YES at S66. However, in another embodiment, the multi-function device 10 may support only the personal type authentication protocol. In this case, the determination unit 42 determines NO at S66.

If it is NO at S66; i.e., if the multi-function device 10 only supports the personal type authentication protocol, the determination unit 42 stores, in the storage unit 30, a value showing that the enterprise type is not supported (S68). When S68 is complete, the wireless connection trying process is ended.

Moreover, if it is YES at S66, the determination unit 42 additionally determines whether the enterprise type wireless setting information is set as the current wireless setting information of the multi-function device 10 (S70). Specifically, the determination unit 42 determines whether information showing any one of the four types of enterprise type EAP authentication methods (EAP-FAST, PEAP, EAP-TTLS, and EAP-TLS) is being stored in the setting information storage area 36. The determination unit 42 determines YES at S70 if the information showing any one of the EAP authentication methods is being stored in the setting information storage area 36, and determines NO at S70 if such information is not being stored in the setting information storage area 36 (i.e., if information showing any one of the four types of personal type authentication protocols is being stored).

If it is NO at S70; i.e., if the enterprise type wireless setting information is not set in the multi-function device 10 (if the personal type wireless setting information is set in the multi-function device 10), the determination unit 42 stores, in the storage unit 30, a value showing that the enterprise type wireless setting information is not being set (S72). When the S72 is complete, the wireless connection trying process is ended.

Moreover, if it is YES at S70, the trying unit 48 performs the enterprise type trying process (refer to FIG. 7) (S74). When the enterprise type trying process is complete, the wireless connection trying process is ended.

(Personal Type Trying Process)

Figure 5:
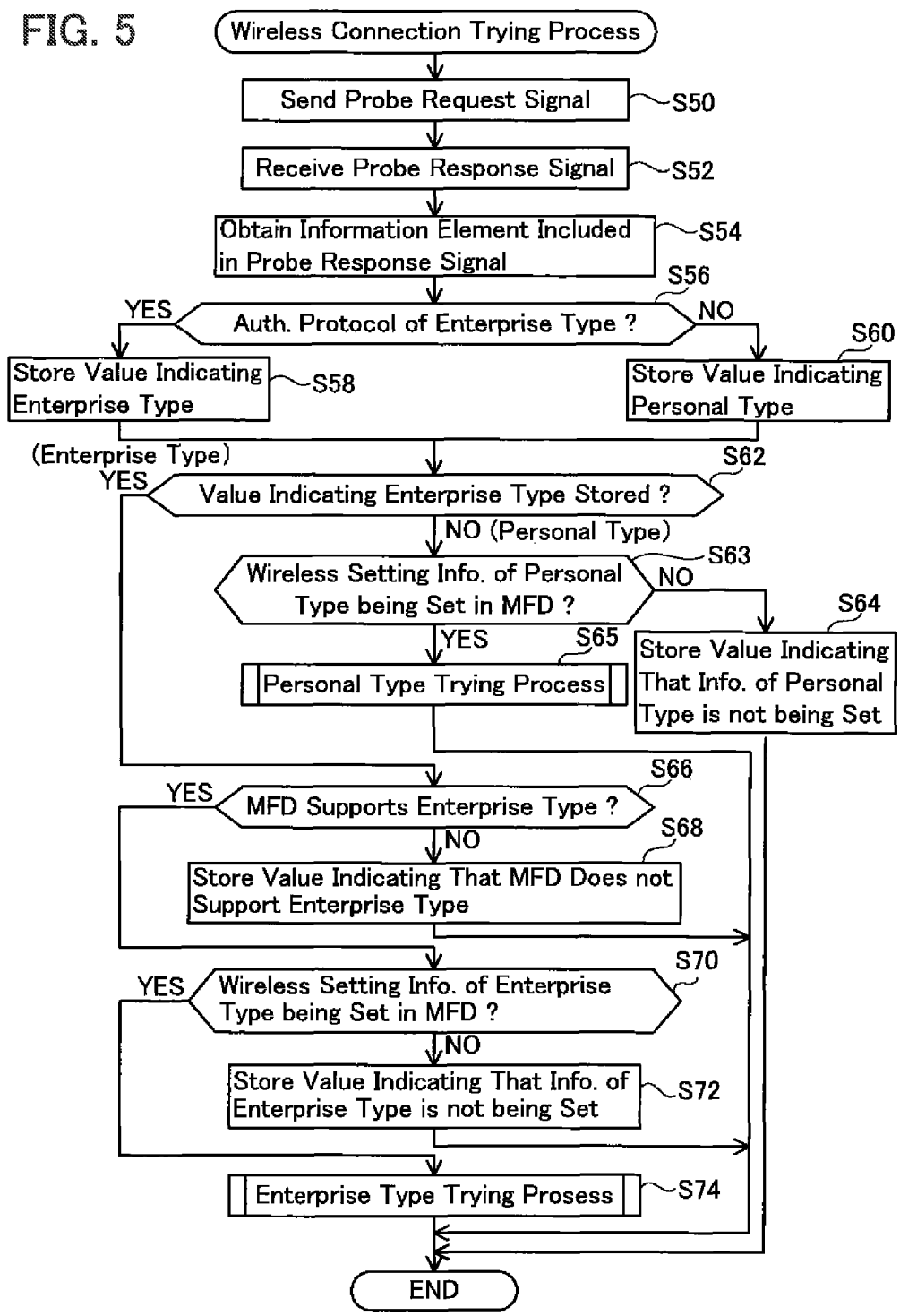
FIG. 5 shows a flowchart of a wireless connection trying process performed at S12 of FIG. 3.

The personal type trying process performed at S65 of FIG. 5 is now explained with reference to FIG. 6. As described above, if the AP 60 operates in accordance with the personal type authentication protocol (NO at S56 and NO at S62 of FIG. 5) and the personal type wireless setting information is being set in the multi-function device 10 (YES at S63 of FIG. 5), the personal type trying process is performed. Note that, in this case, the setting information storage area 36 stores authentication method information (e.g., WPS-PSK) showing the personal type authentication protocol, encryption method information (e.g., TKIP) showing the type of encryption method, and a password.

The trying unit 48 selects one combination among the plurality of combinations (refer to FIG. 2) of the personal type authentication method (authentication protocol) and encryption method supported by the multi-function device 10 (S90). In the example of FIG. 2, there are six combinations of the authentication method and the encryption method: namely, "WPA-PSK/TKIP," "WPA-PSK/AES," "WPA2-PSK/TKIP," "WPA2-PSK/AES," "Open/WEP," and "Shared Key/WEP." The trying unit 48 selects one combination among the six combinations. The order that the trying unit 48 selects the combination is decided in advance. The trying unit 48 selects the combinations in order from the highest security in the wireless communication. Specifically, in the present embodiment, the trying unit 48 selects the combinations in the order of "WPA2-PSK/AES," "WPA2-PSK/TKIP," "WPA-PSK/AES," "WPA-PSK/TKIP," "Shared Key/WEP," and "Open/WEP."

Subsequently, the trying unit 48 tries to make a wireless connection with the AP 60 by using the one combination selected at S90 (S92). Specifically, the trying unit 48 wirelessly sends, to the AP 60, combination information showing the one combination of the authentication method and the encryption method selected at S90, and encryption data created by encrypting original data with the password stored in the setting information storage area 36.

The AP 60 uses the various types of information received from the multi-function device 10 and performs the authentication. This authentication includes, e.g., a first authentication concerning whether the combination of the authentication method and the encryption method shown with the combination information received from the multi-function device 10 is presently being operatively set in the AP 60, and a second authentication concerning whether the password associated with the authentication method and the encryption method shown with the received combination information is presently being set in the AP 60. Note that, with the second authentication, the AP 60 creates the encryption data by encrypting the foregoing original data with the password being set in the AP 60, and determines whether the created encryption data and the encryption data received from the multi-function device 10 are identical. If the first authentication is a failure, the AP 60 wirelessly sends, to the multi-function device 10, first failure information showing that the combination of the authentication method and the encryption method shown with the combination information received from the multi-function device 10 is not being operatively set in the AP 60. If the second authentication is a failure, the AP 60 wirelessly sends second failure information showing a password error to the multi-function device 10. If both the first and second authentications are successful, the AP 60 wirelessly sends successful information showing that the authentication result was successful to the multi-function device 10. Note that the authentication method and the encryption method presently being operatively set in the AP 60 shows, among the combinations of a plurality of types of authentication methods and encryption methods supported by the AP 60, at least one combination of the authentication method and the encryption method that is set as active (valid); in other words, at least one combination of the authentication method and the encryption method for which the authentication method, the encryption method, and the password have been previously set.

Upon receiving the successful information from the AP 60, the trying unit 48 determines YES at S94. In this case, the wireless connection between the multi-function device 10 and the AP 60 is established. Specifically, the wireless connection state of the multi-function device 10 is in the normal state. Note that, although not shown in the flowchart, if it is YES at S94, the trying unit 48 stores, in the setting information storage area 36, information showing the combination of the authentication method and the encryption method (combination in which the wireless connection was successful) selected at S90. Specifically, the trying unit 48 stores, in the setting information storage area 36, the authentication method information showing the type of authentication method (authentication protocol) and the encryption method information showing the type of encryption method selected at S90. The setting information storage area 36 thereby stores the authentication method information and the encryption method information which enable the establishment of the wireless connection with the AP 60. If it is YES at S94, the personal type trying process is ended.

Meanwhile, upon receiving the first failure information or the second failure information from the AP 60, the trying unit 48 determines NO at S94. For example, upon receiving the first failure information from the AP 60, the trying unit 48 associates the information showing the combination selected at S90 (the combination of the authentication method and the encryption method) and a first error value showing that the combination is not being operatively set in the AP 60, and stores this in the storage unit 30 (S96). Moreover, e.g., upon receiving the second failure information from the AP 60, the trying unit 48 associates the information showing the combination selected at S90 (the combination of the authentication method and the encryption method) and a second error value showing a password error, and stores this in the storage unit 30 (S96).

Upon completing S96, the trying unit 48 determines whether all of the above six combinations were selected at S90 (S98). If it is NO at S98, the trying unit 48 returns to S90, and selects one combination among the above six combinations which has not yet been selected. The trying unit 48 performs the processes of S92 onward once again. As a result of the process of S92 of the second time onward, if the wireless connection is established between the multi-function device 10 and the AP 60 (YES at S94), the trying unit 48 erases each piece of information which was previously stored at S96 from the storage unit 30. This is because no information showing an error is required since the wireless connection between the multi-function device 10 and the AP 60 has been established.

Note that, if it is YES at S98, it means that a wireless connection could not be established between the multi-function device 10 and the AP 60 no matter which combination among the above six combinations was used. In this case, for each of the above six combinations, information showing an association of the combination and the first or second error value is stored in the storage unit 30 (S96). If it is YES at S98, the personal type trying process is ended.

(Enterprise Type Trying Process)

The enterprise type trying process performed at S74 of FIG. 5 is now explained with reference to FIG. 7. As explained above, if the AP 60 operates in accordance with the enterprise type authentication protocol (YES at S56 and YES at S62 of FIG. 5) and the enterprise type wireless setting information is set in the multi-function device 10 (YES at S70 of FIG. 5), the enterprise type trying process is performed. Note that, in this case, the setting information storage area 36 stores the EAP authentication method information (e.g., EAP-FAST) showing the type of the enterprise type EAP authentication method, the encryption method information (e.g., TKIP) showing the type of the encryption method, and the user ID. Moreover, if the type of the EAP authentication method is other than EAP-TLS, the setting information storage area 36 additionally stores the inner authentication method information showing the type of the inner authentication method, and the password. If the type of the EAP authentication method is EAP-TLS, the setting information storage area 36 additionally stores the client certification.

The trying unit 48 sequentially performs an authentication of a first process (S110) and an authentication of a second process (S124). Foremost, the trying unit 48 wirelessly sends, to the AP 60, the EAP authentication method information being set in the multi-function device 10 (EAP authentication method information stored in the setting information storage area 36) (S110).

Here, the AP 60 transfers the EAP authentication method information received from the multi-function device 10 to the authentication server 70. The authentication server 70 performs the authentication of the EAP authentication method by using the EAP authentication method information received from the multi-function device 10 via the AP 60. This authentication includes a third authentication concerning whether the authentication server 70 supports the EAP authentication method shown with the received EAP authentication method information. If the third authentication is successful, the authentication server 70 sends a value showing OK to the AP 60. If the third authentication is a failure, the authentication server 70 sends a value showing NG to the AP

60. The AP 60 wirelessly transfers, to the multi-function device 10, the value showing OK or NG received from the authentication server 70.

Upon receiving the value showing OK from the authentication server 70 via the AP 60, the trying unit 48 determines YES at S112, and performs the authentication of the second process (S124).

Upon receiving the value showing NG from the authentication server 70 via the AP 60, the trying unit 48 determines NO at S112, and stores a value showing "First Process=NG" in the storage unit 30 (S114). The trying unit 48 subsequently selects one EAP authentication method among the three types of authentication methods (e.g., PEAP, EAP-TTLS, and EAP-TLS) which are supported by the multi-function device 10 other than the EAP authentication method (e.g., EAP-FAST) shown with the EAP authentication method information sent at S110 (S116) (refer to FIG. 2).

The trying unit 48 thereafter sends the EAP authentication method information showing the EAP authentication method selected at S116 to the authentication server 70 via the AP 60 (S118). The trying unit 48 thereby receives a value showing OK or NG (i.e., a value showing whether it is supported by the authentication server 70) from the authentication server 70 via the AP 60. The trying unit 48 associates the EAP authentication method information showing the EAP authentication method selected at S116 and the previously received value showing the OK or NG and stores this in the storage unit 30 (S120).

Upon completing S120, the trying unit 48 determines whether all of the above three types of EAP authentication methods were selected at S116 (S122). If it is NO in this case, the trying unit 48 returns to S116, and selects one type of EAP authentication method among the above three types of EAP authentication methods which has not yet been selected. The trying unit 48 thereafter performs the processes of S118 to S122 once again.

Note that, if it is YES at S122, the EAP authentication method information showing the EAP authentication method and the value showing OK or NG are associated for each of the above three types of EAP authentication methods and stored in the storage unit 30 (S120). If it is YES at S122, the enterprise type trying process is ended.

Figure 7:
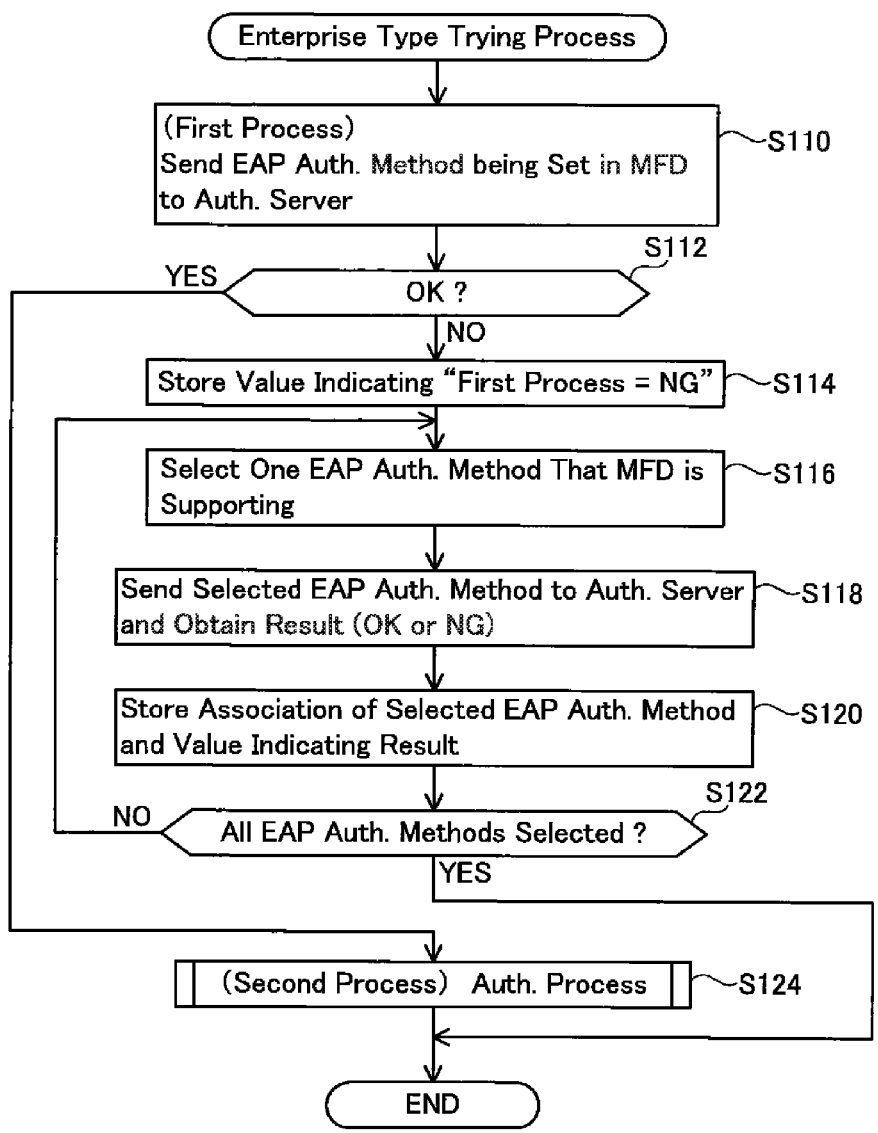
FIG. 7 shows a flowchart of an enterprise type trying process performed at S74 of FIG. 5.
Figure 8:
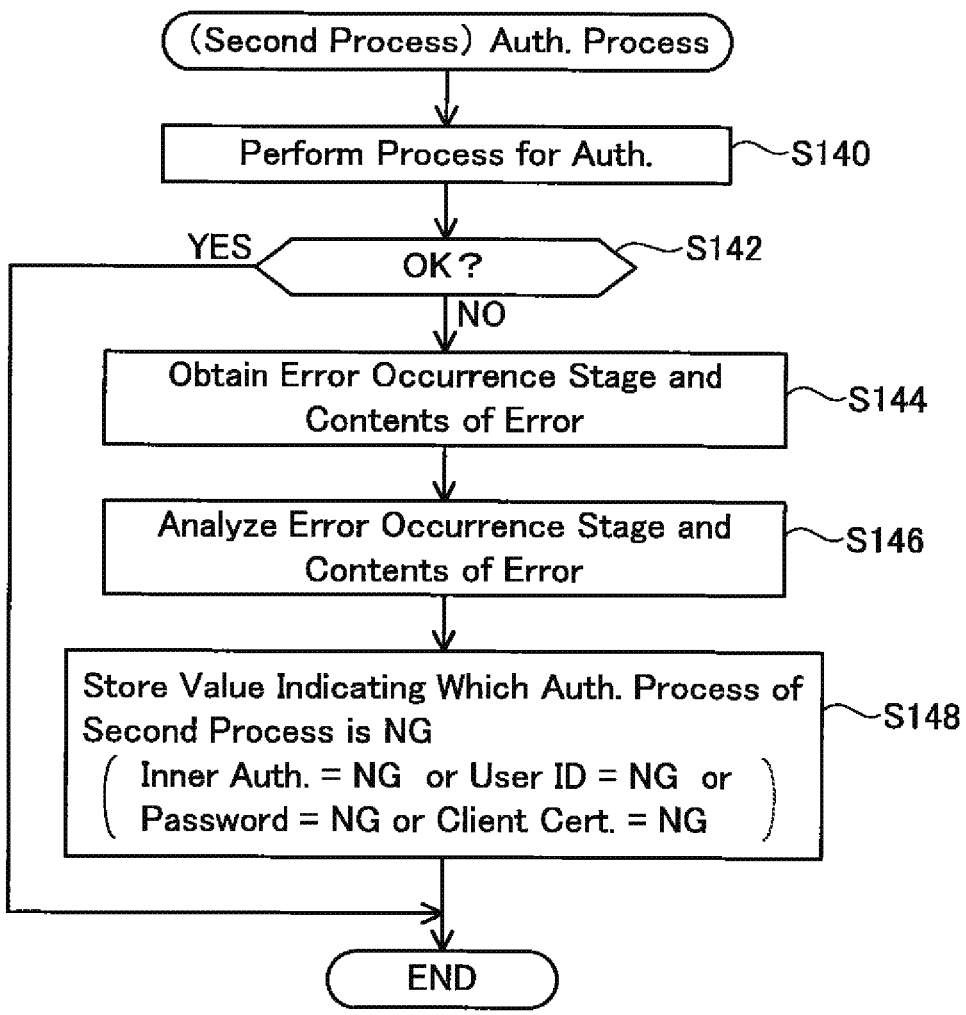
FIG. 8 shows a flowchart of an authentication process of a second process performed at S124 of FIG. 7.

The authentication of the second process performed at S124 of FIG. 7 is now explained with reference to FIG. 8. As a result of sending the EAP authentication method information to the authentication server 70 at S110 of FIG. 7, the connection process of connecting the multi-function device 10 and the authentication server 70 (e.g., establishment of the communication path, encryption of the communication path and so on) is performed. In the connection process, the trying unit 48 performs a process for the authentication server 70 to perform an authentication. For example, the trying unit 48 sends the user ID currently stored in the setting information storage area 36 (i.e., the user ID being set in the multi-function device 10) to the authentication server 70. In addition, if the EAP authentication method information currently stored in the setting information storage area 36 shows an EAP authentication method other than EAP-TLS, the trying unit 48 sends the password currently stored in the setting information storage area 36 to the authentication server 70 (refer to *1 of FIG. 2). Further, if the EAP authentication method information currently stored in the setting information storage area 36 shows EAP-TLS, the trying unit 48 sends the client certification currently stored in the setting information storage area 36 to the authentication server 70 (refer to *2 of FIG. 2). The authentication server 70 performs the authentication including the process of confirming the received information (user ID, and password or client certificate).

The trying unit 48 determines whether the above authentication performed by the authentication server 70 (the authentication including the confirmation of the user ID and password or client certification based on the EAP authentication method and the inner authentication method) was successful (S142). Specifically, e.g., if the above authentication was unsuccessful (e.g., if the received information is inappropriate information), the authentication server 70 may send an error code to the multi-function device 10. The trying unit 48 determines NO at S142 upon receiving the error code showing the authentication error. Moreover, e.g., even in cases where the authentication server 70 does not send an error code to the multi-function device 10, there are cases where an authentication error occurs and the authentication is ended midway. Even in this case, the trying unit 48 determines NO at S142. Meanwhile, if the authentication performed by the authentication server 70 is successful without any error, the trying unit 48 determines YES at S142 and ends the authentication of the second process.

If it is NO at S142, the trying unit 48 obtains information concerning a state where the authentication error occurred and information showing the description of the error (e.g., the error code, information showing the state of the multi-function device 10 upon the occurrence of the error, or the like) (S144). The trying unit 48 subsequently analyzes the information obtained at S144 (S146). The trying unit 48 is thereby able to specify at which stage of the authentication the error occurred.

Subsequently, the trying unit 48 stores, in the storage unit 30, a value showing during which process of the authentication performed by the authentication server 70 the error occurred based on the analysis of S146 (S148). Specifically, the trying unit 48 stores, e.g., a value showing "inner authentication=NG," a value showing "user ID=NG," a value showing "password=NG," or a value showing "client certification=NG." Note that, if an error occurs in a process other than the processes illustrated above, the trying unit 48 may store a value showing "other authentication=NG" at S148.

(Diagnosis Result Output Process)

Figure 4:
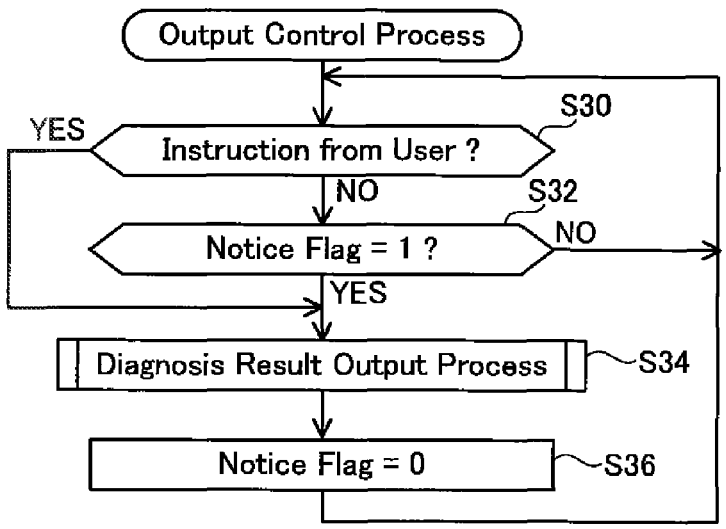
FIG. 4 shows a flowchart of an output control process.

The diagnosis result output process performed at S34 of FIG. 4 is now explained with reference to FIG. 9 and FIG. 10. The diagnosis unit 44 (refer to FIG. 1) determines whether the current wireless connection state of the multi-function device 10 is the connection error state (S160). If it is NO in this case; i.e., if the current wireless connection state of the multi-function device 10 is the normal state, the diagnosis unit 44 uses the text data 34 stored in the storage unit 30 and creates a diagnosis result showing the normal state (i.e., showing that the wireless connection has been established between the multi-function device 10 and the AP 60) (S162). Upon completing S162, the diagnosis unit 44 proceeds to S188 of FIG. 10.

If it is YES at S160, the diagnosis unit 44 performs the processes of S164 onward while referring to the various values currently stored in the storage unit 30; i.e., the various values obtained in the previous wireless connection trying process (S12 of FIG. 3). Note that the process of creating the diagnosis result described later (e.g., S168, S172 and so on) also uses the text data 34 as with the process of S162, but the explanation thereof is omitted below.

Foremost, the diagnosis unit 44 determines whether the value showing the personal type is stored in the storage unit 30 (S164). If S60 of FIG. 5 was performed in the previous wireless connection trying process, the determination is YES at S164. In this case, the diagnosis unit 44 additionally determines whether the value showing that the personal type wireless setting information is not being set is stored in the storage unit 30 (S166). If S64 of FIG. 5 was performed in the previous wireless connection trying process, the determination is YES at S166.

If it is YES at S166, it means that, although the personal type wireless setting information is being set in the AP 60, the personal type wireless setting information is not being set in the multi-function device 10. In this case, the diagnosis unit 44 creates a diagnosis result including a first character string showing that the security setting (i.e., the wireless setting information) of the multi-function device 10 is wrong, a second character string showing that the personal type wireless setting information is being set in the AP 60, and a third character string for urging the user to change the security setting of the multi-function device 10 (S168). In other words, the diagnosis result created at S168 includes the reason (the first character string and second character string) of the connection error state, and the countermeasure (the third character string) for resolving the connection error state. Upon completing S168, the diagnosis unit 44 proceeds to S188 of FIG. 10.

If it is NO at S166, it means that, although the personal type wireless setting information is being set in both the AP 60 and the multi-function device 10, a wireless connection was not established between the AP 60 and the multi-function device 10. In this case, the diagnosis unit 44 uses each value stored at S96 of FIG. 6 in the previous wireless connection trying process and creates the diagnosis result (S172). As described above, at S96 of FIG. 6, for each of the six combinations of the authentication method and the encryption method, information showing the combination and the first error value (not set in the AP 60) or the second error value (password error) is stored. At S172, the diagnosis unit 44 foremost specifies a combination that is associated with the second error value among the six combinations. Subsequently, the diagnosis unit 44 specifies the range of number of characters of the password to be used in the specified combination. For example, if the specified combination is "WPA-PSK/TKIP," the diagnosis unit 44 specifies 8 to 64 characters (refer to *3 of FIG. 2). Moreover, e.g., if the specified combination is "Open/WEP," the diagnosis unit 44 specifies 5, 10, 13, 26 characters (refer to *4 of FIG. 2). Subsequently, the diagnosis unit 44 creates a diagnosis result including a fourth character string showing that the password is wrong, and a fifth character string for urging the user to input a password within the range of the specified number of characters. Specifically, the diagnosis result created at S172 includes the reason (the fourth character string) of the connection error state, and the countermeasure (the fifth character string) for resolving the connection error state. Upon completing S172, the diagnosis unit 44 proceeds to S188 of FIG. 10.

If it is NO at S164, the diagnosis unit 44 additionally determines whether the value showing that the enterprise type is not supported is stored in the storage unit 30 (S174). If S68 of FIG. 5 was performed in the previous wireless connection trying process, the determination is YES at S174.

If it is YES at S174, it means that, although the enterprise type wireless setting information is being set in the AP 60, the enterprise type authentication method is not supported by the multi-function device 10. The diagnosis unit 44 creates a diagnosis result including a sixth character string showing that the multi-function device 10 does not correspond to the security setting of the AP 60, a seventh character string for urging the user to change the security setting of the AP 60, and an eighth character string for urging the user to achieve a wireless communication of the multi-function device 10 with an AP that is different from the AP 60 (S176). Specifically, the diagnosis result created at S176 includes the reason (the sixth character string) of the connection error state, and the countermeasure (the seventh character string and eighth character string) for resolving the connection error state. Upon completing S176, the diagnosis unit 44 proceeds to S188 of FIG. 10.

If it is NO at S174, as shown in FIG. 10, the diagnosis unit 44 additionally determines whether a value showing that the enterprise type wireless setting information is not being set is stored in the storage unit 30 (S178). If S72 of FIG. 5 was performed in the previous wireless connection trying process, the determination is YES at S178.

If it is YES at S178, it means that, although the enterprise type wireless setting information is being set in the AP 60, the enterprise type wireless setting information is not being set in the multi-function device 10. In this case, the diagnosis unit 44 creates a diagnosis result including a ninth character string showing that the security setting of the multi-function device 10 is wrong, a tenth character string showing that the enterprise type wireless setting information is being set in the AP 60, and an eleventh character string for urging the user to change the security setting of the multi-function device 10 (S180). Specifically, the diagnosis result created at S180 includes the reason (the ninth character string and tenth character string) of the connection error state, and the countermeasure (the eleventh character string) for resolving the connection error state. Upon completing S180, the diagnosis unit 44 proceeds to S188 of FIG. 10.

If it is NO at S178, the diagnosis unit 44 additionally determines whether the value showing "First Process=NG" is stored in the storage unit 30 (S182). If S114 of FIG. 7 was performed in the previous wireless connection trying process, the determination is YES at S182.

If it is YES at S182, it means that, although the enterprise type wireless setting information is being set in both the AP 60 and the multi-function device 10, the wireless connection was not established between the AP 60 and the multi-function device 10 due to the first process of S110 of FIG. 7. Specifically, it means that the authentication server 70 does not support the EAP authentication method being set in the multi-function device 10. In this case, the diagnosis unit 44 uses the value stored at S120 of FIG. 7 in the previous wireless connection trying process and creates the diagnosis result (S184). As explained above, at S120 of FIG. 7, for each of the three types of EAP authentication methods supported by the multi-function device 10, an association of the EAP authentication method information showing the EAP authentication method and the value showing OK or NG is stored. At S184, the diagnosis unit 44 specifies the EAP authentication method information associated with the value showing OK. Subsequently, the diagnosis unit 44 creates a diagnosis result including a twelfth character string showing that the authentication method is wrong, and a thirteenth character string (a character string including a list of EAP authentication methods supported by the authentication server 70) for urging the user to change the specified EAP authentication method information. Specifically, the diagnosis result created at S184 includes the reason (the twelfth character string) of the connection error state, and the countermeasure (the thirteenth character string) for resolving the connection error state. Upon completing S184, the diagnosis unit 44 proceeds to S188 of FIG. 10.

If it is NO at S182, it means that the wireless connection between the AP 60 and the multi-function device 10 was not established due to the second process of S124 of FIG. 7. In this case, the diagnosis unit 44 uses the value stored in the S148 of FIG. 8 in the previous wireless connection trying process and creates the diagnosis result (S186). As described above, at S148 of FIG. 8, one value among "inner authentication=NG," "user ID=NG," "password=NQ," and "client certification=NG" is stored. At S186, the diagnosis unit 44 creates a diagnosis result including a fourteenth character string showing an authentication failure, and a fifteenth character string showing that the information (e.g., inner authentication) corresponding to the value stored at S148 of FIG. 8 is wrong. Specifically, the diagnosis result created at S186 includes the reason (the fourteenth character string and fifteenth character string) of the connection error state. Upon completing S186, the diagnosis unit 44 proceeds to S188 of FIG. 10.

At S188, the outputting unit 46 (refer to FIG. 1) causes the printing unit (not shown) in the multi-function device 10 to print an image representing the diagnosis result created at S162, S168, S172, S176 of FIG. 9, or S180, S184 or S186 of FIG. 10. The user is thereby able to view the diagnosis result.

The wireless communication system 2 of this embodiment was explained in detail. In this embodiment, the obtaining unit 40 of the multi-function device 10 obtains the Information Element from the AP 60 (S54 of FIG. 5). The determination unit 42 determines, by determining whether the enterprise information is included in the Information Element, whether the AP 60 operates in accordance with the enterprise type authentication protocol in which the authentication is performed by the authentication server 70, or operates in accordance with the personal type authentication protocol in which the authentication is performed by the AP 60 (S56 of FIG. 5). According to this configuration, the multi-function device 10 can appropriately determine the type of authentication protocol with which the AP 60 operates.

The diagnosis unit 44 diagnoses the wireless connection state of the multi-function device 10 based on the determination result of S56 of FIG. 5 (by referring to the value at S164 of FIG. 9) (S164 of FIG. 9 to S186 of FIG. 10). As described above, if the wireless connection state of the multi-function device 10 is in the connection error state, the diagnosis result (S168, S172, S176 of FIG. 9, S180, S184, S186 of FIG. 10) includes at least one of the reason of the connection error state and the countermeasure for resolving the connection error state. The outputting unit 46 causes the printing unit to print an image representing the diagnosis result. According to the foregoing configuration, the multi-function device 10 is able to make appropriate diagnosis according to the type of authentication protocol with which the AP 60 operates. Specifically, the multi-function device 10 can specify the reason of the connection error state which occurs due to the enterprise type authentication protocol if the AP 60 operates in accordance with the enterprise type authentication protocol (S174 of FIG. 9 to S186 of FIG. 10), and specify the reason of the connection error state which occurs due to the personal type authentication protocol if the AP 60 operates in accordance with the personal type authentication protocol (S166 to S172 of FIG. 9). The multi-function device 10 can provide an appropriate diagnosis result of the wireless connection state to the user according to the type of authentication protocol with which the AP 60 operates.

If it is determined that the AP 60 operates in accordance with the enterprise type authentication protocol (YES at S56 of FIG. 5 and NO at S164 of FIG. 9), the diagnosis unit 44 makes the diagnosis according to S174 of FIG. 9 to S186 of FIG. 10. Meanwhile, it is determined that the AP 60 operates according to the personal type authentication protocol (NO at S56 of FIG. 5 and YES at S164 of FIG. 9), the diagnosis unit 44 makes the diagnosis according to S166 to S172 of FIG. 9. According to the foregoing configuration, the multi-function device 10 can make an appropriate diagnosis since it uses a different diagnosis method according to the type of authentication protocol with which the AP 60 operates.

The determination unit 42 additionally determines whether the multi-function device 10 supports the enterprise type authentication protocol (S66 of FIG. 5). The diagnosis unit 44 makes the diagnosis based on the determination result of S66 of FIG. 5 (by referring to the value at S174 of FIG. 9). According to the foregoing configuration, the multi-function device 10 can make an appropriate diagnosis according to whether the multi-function device 10 supports the enterprise type authentication protocol.

The determination unit 42 additionally determines whether the enterprise type wireless setting information is being set in the multi-function device 10 (S70 of FIG. 5). The diagnosis unit 44 makes the diagnosis based on the determination result of S70 of FIG. 5 (by referring to the value at S178 of FIG. 10). According to the foregoing configuration, the multi-function device 10 is able to make an appropriate diagnosis according to the whether the enterprise type wireless setting information is being set in the multi-function device 10.

The diagnosis unit 44 analyzes the connection process that is performed for connecting the multi-function device 10 to the authentication server 70 via the AP 60 (S182 to S186 of FIG. 10). According to this configuration, the multi-function device 10 can make an appropriate diagnosis according to the analysis of the connection process. In particular, the connection process includes the first process (S110 of FIG. 7) and the second process (S124 of FIG. 7). The diagnosis unit 44 creates the diagnosis result corresponding to the first process (S184 of FIG. 10) if the first process ends in a failure (YES at S182 of FIG. 10), and creates the diagnosis result corresponding to the second process (S186 of FIG. 10) if the second process ends in a failure (NO at S182 of FIG. 10). According to the foregoing configuration, the multi-function device 10 can provide an appropriate diagnosis result to the user according to the analysis of the connection process.

The trying unit 48 uses the wireless setting information being set in the multi-function device 10 and tries to achieve a wireless communication with the AP 60 (S65 of FIG. 5, S74 of FIG. 5). The diagnosis unit 44 makes the diagnosis based on the information obtained in the process of trying the wireless connection (information stored at S96 of FIG. 6, information stored at S120 of FIG. 7, information stored at S148 of FIG. 8). According to the foregoing configuration, multi-function device 10 can make an appropriate diagnosis since it makes the diagnosis based on the information acquired in the process of trying the wireless connection.

Moreover, if the user instructs the diagnosis (YES at S30 of FIG. 4), the trying unit 48 does not perform the wireless connection trying process of S12 of FIG. 3. Specifically, the diagnosis unit 44 makes the diagnosis based on the information acquired in the process of wireless connection that was performed before the foregoing instruction. According to this configuration, the diagnosis result can be promptly provided to the user even when instructed by the user since the process of trying of the wireless connection is not performed.

Figure 6:
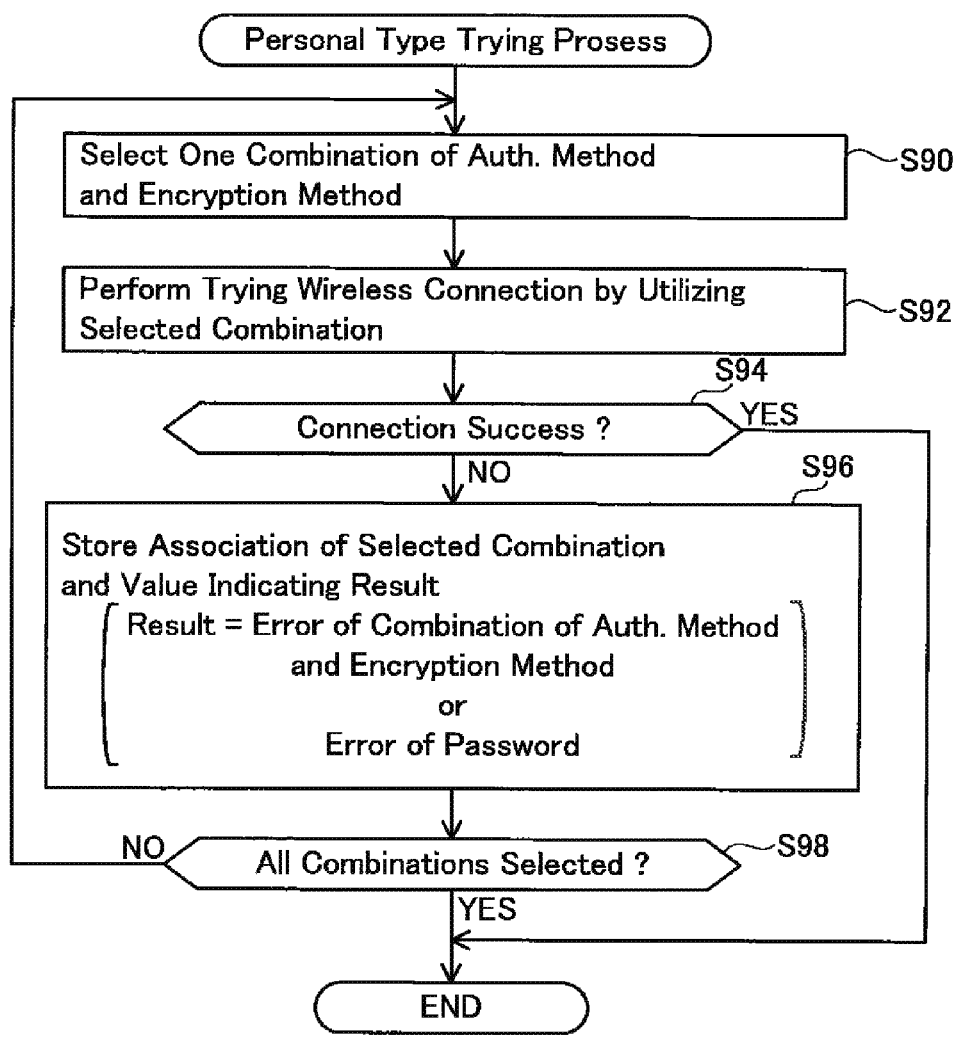
FIG. 6 shows a flowchart of a personal type trying process performed at S65 of FIG. 5.

The trying unit 48 obtains, in the personal type trying process of FIG. 6, information (information stored at S96) concerning the combination of the authentication method and the encryption method being operatively set in the AP 60. The diagnosis unit 44 creates a diagnosis result according to the combination of the authentication method and the encryption method being operatively set in the AP 60 based on the information stored at S96 (S172 of FIG. 9). According to the foregoing configuration, the multi-function device 10 can provide an appropriate diagnosis result to the user according to the combination of the authentication method and the encryption method being operatively set in the AP 60 if it is determined that the AP 60 operates in accordance with the personal type authentication protocol.

As described above, "1" is stored as the notice flag if the value obtained in the present wireless connection trying process at S18 of FIG. 3 and the value obtained in the previous wireless connection trying process are determined to be different. For example, in the personal type wireless setting information was set in both the AP 60 and the multi-function device 10 in the previous wireless connection trying process, a value showing the personal type is stored at S60 of FIG. 5. Subsequently, the wireless setting information of the AP 60 is changed to the enterprise type wireless setting information, and, when the present wireless connection trying process is performed, a value showing the enterprise type is stored at S58 of FIG. 5. In this case, since the value obtained in the present wireless connection trying process and the value obtained in the previous wireless connection trying process will differ, it is determined as YES at S18 of FIG. 3, and "1" is stored as the notice flag (S20 of FIG. 3). In this embodiment, if the value obtained in the present wireless connection trying process and the value obtained in the previous wireless connection trying process are different (i.e., if "1" is stored as the notice flag), the diagnosis result output process of S34 of FIG. 4 is performed (i.e., the diagnosis unit 44 makes a diagnosis and the outputting unit 46 causes the printing unit to print the diagnosis result). According to this configuration, if the wireless setting information of at least one of the AP 60 and the multi-function device 10 is changed, the multi-function device 10 can provide an appropriate diagnosis result to the user according to the new wireless setting information.

The trying unit 48 obtains, in the process of trying the wireless connection, information (information stored at S120 of FIG. 7) concerning the authentication method supported by the authentication server 70. The diagnosis unit 44 creates the diagnosis result showing the authentication method supported by the authentication server 70 based on the information stored at S120 (S184 of FIG. 10). According to the foregoing configuration, the user can know the authentication method supported by the authentication server 70 by viewing the diagnosis result.

As evident from the foregoing explanation, the enterprise type authentication protocol; i.e., the authentication protocol (WPA-Enterprise, WPA2-Enterprise) for the wireless communication using IEEE802.1x of the wireless LAN standard is an example of the "first type of authentication protocol," and the personal type authentication protocol; i.e., the authentication protocol for the wireless communication that does not use IEEE802.1x of the wireless LAN standard is an example of the "second type of authentication protocol." Accordingly, the enterprise type wireless setting information and the personal type wireless setting information are respectively examples of the "first type of wireless setting information" and the "second type of wireless setting information." The Information Element is an example of the "specific information," and the enterprise information that may be included in the Information Element is an example of the "information showing the first type of authentication protocol."

Modified Example 1

The outputting unit 46 may cause another printer to print the diagnosis result rather than causing the printing unit of the multi-function device 10 to print the diagnosis result. Moreover, the outputting unit 46 may display the diagnosis result on the display unit 14 of the multi-function device 10 or display the diagnosis result on a display unit of another device (e.g., the PC not shown). In other words, generally speaking, the "output the diagnosis result outside" may mean to cause an internal and/or an external printing unit of the wireless communication device to print the diagnosis result, or to cause an internal and/or an external display unit of the wireless communication device to display the diagnosis result.

Modified Example 2

The diagnosis unit 44 does not need to create a diagnosis result including both the reason of the connection error state and the countermeasure for resolving the connection error state upon creating the diagnosis result in FIG. 9 and FIG. 10 (e.g., S168, S172, S176 and so on), and may create a diagnosis result including only one of the reason and the countermeasure. For example, the diagnosis unit 44 may create a diagnosis result including only the character string (reason) showing that the authentication method is wrong at S184 of FIG. 10, or create a diagnosis result including only a list (countermeasure) of the authentication methods supported by the authentication server 70.

Modified Example 3

The foregoing embodiment is assuming a case where the wireless connection trying process of S12 of FIG. 3 is performed in a state where the wireless connection between the multi-function device 10 and the AP 60 is established and such wireless connection is subsequently disconnected (YES at S10 of FIG. 3). However, e.g., technology of the foregoing embodiment can also be applied to a state where the multi-function device 10 initially achieves a wireless connection with the AP 60. Specifically, at the stage of initially setting the wireless setting information in the multi-function device 10, since the wireless connection is not established between the multi-function device 10 and the AP 60, the result at S10 of FIG. 3 may be determined to be YES, and the wireless connection trying process of S12 may thereby be performed. Here, if the wireless connection is not established (NO at S14), since there is no value that was obtained in the previous wireless connection trying process, the determination is YES at S18 and "1" is stored as the notice flag (S22). Consequently, the determination is YES at S32 of FIG. 4, and the diagnosis result output process of S34 is thereby performed.

Modified Example 4

The technique of the foregoing embodiment can be applied to the control device of other wireless communication devices such as a PC, mobile communication terminal, server, printer, scanner, telephone, or facsimile in addition to the multi-function device 10.

Modified Example 5

In the foregoing embodiment, respective units 40 to 48 are realized as a result of the control device 20 performing the processes according to the program 32. Nevertheless, at least one unit of respective units 40 to 48 may alternately be realized by a hardware resource such as a logic circuit.

The invention claimed is:

1. A wireless communication device configured to be wirelessly connected with an access point, the wireless communication device comprising:

a control device; and a machine-readable memory having instructions stored therein, the instructions, when executed by the control device, control the wireless communication device to function as:

an obtaining unit configured to obtain specific information from the access point;

a determination unit configured to perform, by utilizing the specific information, a first determination process of determining whether the access point operates in accordance with an enterprise type of authentication protocol in which an authentication is performed by an authentication server or operates in accordance with a personal type of authentication protocol in which an authentication is performed by the access point;

a diagnosis unit configured to make a diagnosis of a wireless connection state of the wireless communication device based on a determination result of the first determination process so as to create a diagnosis result, wherein in a case where the wireless connection state is a connection error state, the diagnosis result includes at least one of a reason by which the connection error state has occurred and a procedure for resolving the connection error state to achieve a wireless connection with the access point, wherein the diagnosis unit is configured to make the diagnosis in accordance with a first diagnosis method in a case where a determination is made in the first determination process that the access point operates in accordance with the enterprise type of authentication protocol, the first diagnosis method includes a diagnosis relating to an EAP authentication method and a diagnosis relating to an inner authentication method, and wherein the diagnosis unit is configured to make the diagnosis in accordance with a second diagnosis method which is different from the first diagnosis method in a case where a determination is made in the first determination process that the access point operates in accordance with the person type of authentication protocol, the second diagnosis method does not include the diagnosis relating to the EAP authentication method and the diagnosis relating to the inner authentication method, and includes a diagnosis relating to whether a personal type of wireless setting information is currently set in the wireless communication device, the personal type of wireless setting information being information for causing the wireless communication device to operate in accordance with the personal type of authentication protocol; and an outputting unit configured to output the diagnosis result external to the control device as at least one of:
causing an internal printing unit of the wireless communication device to print the diagnosis result,
causing an external printing unit relative to the wireless communication device to print the diagnosis result,
causing an internal display unit of the wireless communication device to display the diagnosis result, and
causing an external display unit relative to the wireless communication device to display the diagnosis result.

2. The wireless communication device as in claim 1, wherein in the first determination process, the determination unit determines that:
the access point operates in accordance with the enterprise type of authentication protocol in a case where the specific information includes information indicating the enterprise type of authentication protocol, and
the access point operates in accordance with the personal type of authentication protocol in a case where the specific information does not include the information indicating the enterprise type of authentication protocol.

3. The wireless communication device as in claim 1, wherein the determination unit further performs a second determination process of determining whether the wireless communication device is supporting the enterprise type of authentication protocol, and
wherein the diagnosis unit makes the diagnosis based further on a determination result of the second determination process.

4. The wireless communication device as in claim 1, wherein the determination unit further performs a third determination process of determining whether an enterprise type of wireless setting information is currently set in the wireless communication device, the enterprise type of wireless setting information being information for making the wireless communication device operate in accordance with the enterprise type of authentication protocol, and
wherein the diagnosis unit makes the diagnosis based further on a determination result of the third determination process.

5. The wireless communication device as in claim 4, wherein in a case where a determination is made in the first determination process that the access point operates in accordance with the enterprise type of authentication protocol and a determination is made in the third determination process that the enterprise type of wireless setting information is currently set in the wireless communication device, and
wherein the diagnosis unit makes the diagnosis by analyzing a connection process performed for connecting the wireless communication device with the authentication server via the access point.

6. The wireless communication device as in claim 5, wherein the connection process includes a plurality of partial processes, and
wherein in the case where the wireless connection state is the connection error state, the diagnosis unit creates the diagnosis result corresponding to a specific partial process which has caused the connection error state, the specific partial process being included in the plurality of partial processes.

7. The wireless communication device as in claim 1, wherein the control device is configured to further function as a trying unit configured to perform a trying process of trying a wireless connection with the access point by utilizing wireless setting information that is currently set in the wireless communication device, and
wherein the diagnosis unit makes the diagnosis based further on information obtained during the trying process.

8. The wireless communication device as in claim 7, wherein when an instruction for making the diagnosis is given by a user:
the trying unit does not perform the trying process, and
the diagnosis unit makes the diagnosis based on the information obtained during the trying process which had been performed before the instruction.

9. The wireless communication device as in claim 7,
wherein in a case where the personal type of wireless setting information is currently set in the wireless communication device, the trying unit sequentially performs the trying process by sequentially utilizing each of a plurality of combinations of an authentication method and an encryption method so as to obtain first information related to a combination of an authentication method and an encryption method that is currently operatively set in the access point, and
wherein in a case where a determination is made in the first determination process that the access point operates in accordance with the personal type of authentication protocol and the wireless connection state is the connection error state, the diagnosis unit creates, based on the first information, the diagnosis result according to the combination of the authentication method and the encryption method that is currently operatively set in the access point.

10. The wireless communication device as in claim 7,
wherein in a case where wireless setting information which has been set in at least one of the access point and the wireless communication device at a timing of presently performing the trying process by the trying unit is different from wireless setting information which had been set in the at least one of the access point and the wireless communication device at a timing of previously performing the trying process by the trying unit:
the diagnosis unit makes the diagnosis, and
the outputting unit outputs the diagnosis result external to the control device.

11. The wireless communication device as in claim 7,
wherein the trying unit obtains second information during the trying process, the second information being related to an authentication method that the authentication server is supporting, and
wherein the diagnosis unit creates, based on the second information, the diagnosis result indicating the authentication method that the authentication server is supporting.

12. A non-transitory computer-readable recording medium storing a computer program for a wireless communication device, the wireless communication device configured to be wirelessly connected with an access point, the computer program including instructions, when executed by a control device, control the wireless communication device to perform operations comprising:
obtaining specific information from the access point;
performing, by utilizing the specific information, a first determination process of determining whether the access point operates in accordance with an enterprise type of authentication protocol in which an authentication is performed by an authentication server or operates in accordance with a personal type of authentication protocol in which an authentication is performed by the access point;
making a diagnosis of a wireless connection state of the wireless communication device based on a determination result of the first determination process so as to create a diagnosis result, wherein in a case where the wireless connection state is a connection error state, the diagnosis result includes at least one of a reason by which the connection error state has occurred and a procedure for resolving the connection error state to achieve a wireless connection with the access point,
wherein making the diagnosis makes the diagnosis in accordance with a first diagnosis method in a case where a determination is made in the first determination process that the access point operates in accordance with the enterprise type of authentication protocol, the first diagnosis method includes a diagnosis relating to an EAP authentication method and a diagnosis relating to an inner authentication method, and
wherein making the diagnosis makes the diagnosis in accordance with a second diagnosis method which is different from the first diagnosis method in a case where a determination is made in the first determination process that the access point operates in accordance with the personal type of authentication protocol, the second diagnosis method does not include the diagnosis relating to the EAP authentication method and the diagnosis relating to the inner authentication method, and includes a diagnosis relating to whether a personal type of wireless setting information is currently set in the wireless communication device, the personal type of wireless setting information being information for causing the wireless communication device to operate in accordance with the personal type of authentication protocol; and
outputting the diagnosis result external to the control device as at least one of:
causing an internal printing unit of the wireless communication device to print the diagnosis result,
causing an external printing unit relative to the wireless communication device to print the diagnosis result,
causing an internal display unit of the wireless communication device to display the diagnosis result, and
causing an external display unit relative to the wireless communication device to display the diagnosis result.

* * * * *